United States Patent
Jang et al.

(10) Patent No.: US 9,048,703 B2
(45) Date of Patent: Jun. 2, 2015

(54) SYSTEM AND METHOD FOR CONTROLLING POWER TRUNK

(71) Applicant: MOTOTECH. CO. LTD, Hwaseong-si, Gyeonggi-do (KR)

(72) Inventors: Se Young Jang, Suwon-si (KR); Jae Hyoung An, Namyangju-si (KR); Sang Il Lee, Suwon-si (KR)

(73) Assignee: MOTOTECH.CO.LTD, Hwaseong-si (KR)

( * ) Notice: Subject to any disclaimer, the term of this patent is extended or adjusted under 35 U.S.C. 154(b) by 136 days.

(21) Appl. No.: 13/730,089

(22) Filed: Dec. 28, 2012

(65) Prior Publication Data

US 2013/0169197 A1 Jul. 4, 2013

(30) Foreign Application Priority Data

Dec. 29, 2011 (KR) ........................ 10-2011-0145709

(51) Int. Cl.
*G05B 11/42* (2006.01)
*H02K 7/14* (2006.01)
*E05F 15/20* (2006.01)

(52) U.S. Cl.
CPC ...... *H02K 7/14* (2013.01); *E05F 15/20* (2013.01); *E05Y 2400/10* (2013.01); *E05Y 2400/30* (2013.01); *E05Y 2400/36* (2013.01); *E05Y 2900/548* (2013.01)

(58) Field of Classification Search
USPC ........... 318/3, 599, 610, 609; 327/335, 336, 1
See application file for complete search history.

(56) References Cited

U.S. PATENT DOCUMENTS

| | | | | |
|---|---|---|---|---|
| 5,764,008 | A * | 6/1998 | Hahn et al. | 318/256 |
| 5,770,934 | A * | 6/1998 | Theile | 318/469 |
| 5,804,937 | A * | 9/1998 | Sasajima et al. | 318/259 |
| 6,164,015 | A * | 12/2000 | Kawanobe et al. | 49/360 |
| 6,870,339 | B2 * | 3/2005 | Kessler et al. | 318/468 |
| 7,346,272 | B2 * | 3/2008 | Franzan | 388/800 |
| 7,688,013 | B2 * | 3/2010 | Frommer et al. | 318/466 |
| 8,055,399 | B2 * | 11/2011 | Wyatt et al. | 701/22 |
| 8,089,237 | B2 * | 1/2012 | Bernhard et al. | 318/476 |

\* cited by examiner

*Primary Examiner* — Rita Leykin
(74) *Attorney, Agent, or Firm* — Birch, Stewart, Kolasch & Birch, LLP

(57) ABSTRACT

Disclosed is a system for controlling a power trunk in a trunk-equipped vehicle, including: a motor configured to transfer power to the trunk to drive the trunk; a velocity sensing unit configured to sense a velocity of the motor; a control unit configured to compute a current trunk position and an operational velocity based on information on the velocity of the motor sensed by the velocity sensing unit and control the motor based on the computed position and the operational velocity, wherein a predetermined target velocity and the operational velocity are compared, and a difference between the target velocity and the operational velocity is compensated using a proportional integral derivative (PID) control scheme. It is possible to constantly control an open/close velocity of a power trunk regardless of a change of external environments when a power trunk is opened or closed in a vehicle having a power trunk system.

8 Claims, 4 Drawing Sheets

SYSTEM AND METHOD FOR CONTROLLING POWER TRUNK

CROSS REFERENCES TO RELATED APPLICATIONS

The present invention contains subject matter related to Korean Patent Application No. 2011-0145709, filed in the Korean Patent Office on Dec. 29, 2011, the entire contents of which are incorporated herein by reference.

BACKGROUND OF THE INVENTION

1. Field of the Invention

The present invention relates to a system and method for controlling a power trunk, and more particularly, to a system and method for controlling a power trunk, capable of opening or closing a trunk provided in the rear side of a vehicle.

2. Description of Related Art

In general, a trunk is used to store general luggage, an emergency tool kit, a spare tire, and the like. In some cases, a first-aid kit and the like are stored in the trunk for preparation against an accident. A lid that covers such a trunk room is called a trunk lid.

The trunk lid is locked/unlocked by a trunk locking device, which includes a hinge for allowing the trunk lid to be lifted even by a weak force as the locking device is released.

Recently, an automatic power trunk system capable of automatically opening or closing the trunk lid by making a simple switch operation on a driver seat has been developed.

In the related art, various techniques to control driving of the power trunk have been proposed.

By way of example of the related art, there is known a technique in which an angle of the trunk and a movement velocity is transmitted from a Hall sensor, the movement velocity of the trunk is classified into an accelerating cycle, a decelerating cycle, and a constant velocity cycle, and the velocity of the power trunk is controlled by increasing, decreasing, or maintaining a duty ratio at a constant rate for each cycle. In this technique, output power of a motor is controlled by increasing or decreasing the pulse width modulation (PWM) duty ratio at a constant rate so as to control the velocity of the trunk for each cycle.

However, in this technique of the related art, the duty ratio simply increases or decreases at a certain rate, and it fails to constantly maintain an open/close velocity of the trunk depending on external environments (such as a temperature or an inclination) of a vehicle. That is, in the related art, since the velocity of the power trunk is controlled regardless of external environments, a problem may occur in the power trunk velocity control when external environment changes during driving. In addition, in order to constantly maintain a power trunk velocity in consideration of external environment, the control system necessitates some factors such as a target or a profile, which are logically complicated.

SUMMARY OF THE INVENTION

In this regard, the invention provides a system and method for controlling a power trunk, capable of constantly controlling a power trunk open/close velocity regardless of external environments of a vehicle.

According to an aspect of the invention, there is provided a system for controlling a power trunk in a trunk-equipped vehicle, including: a motor configured to transfer power to the trunk to drive the trunk; a velocity sensing unit configured to sense a velocity of the motor; a control unit configured to compute a current trunk position and an operational velocity based on information on the velocity of the motor sensed by the velocity sensing unit and control the motor based on the computed position and the computed operational velocity, wherein a predetermined target velocity and the operational velocity are compared, and a difference between the target velocity and the operational velocity is compensated using a proportional integral derivative (PID) control scheme.

The velocity sensing unit may be a Hall sensor.

The control unit may control the motor such that a revolution per minute (RPM) of the motor measured using the Hall sensor and an RPM of the target velocity are compared, and a difference between the RPM of the motor and the RPM of the target velocity is compensated using a PID control scheme.

The control unit may control the motor such that a pulse width modulation (PWM) duty ratio is controlled using the PID control scheme.

The control unit may use following equations in the PID control scheme:

$$MV_n = MV_{n-1} + \Delta MV_n, \text{ and}$$

$$\Delta MV_n = Kp^*(e_n - e_{n-1}) + Ki^* e_n + Kd^*((e_n - e_{n-1}) - (e_{n-1} - e_{n-2}))$$

where $MV_n$ denotes a current manipulated variable, $MV_{n-1}$ denotes a previous manipulated variable, $\Delta MV_n$ denotes a derivative of the current manipulated variable, $e_n$ denotes a current difference, $e_{n-1}$ denotes a previous difference, $e_{n-2}$ denotes a second previous difference, Kp denotes a proportional coefficient, Ki denotes a proportional integral coefficient, and Kd denotes a proportional differential coefficient.

According to another aspect of the invention, there is provided a method of controlling a power trunk in a power trunk system including a trunk, a motor configured to transfer power to the trunk to drive the trunk, a velocity sensing unit configured to sense a velocity of the motor, and a control unit configured to control opening/closing of the trunk, the method including: obtaining a current position of the trunk and an operational velocity based on information of the velocity of the motor sensed by the velocity sensing unit; comparing a predetermined target velocity and the operational velocity and compensating a difference between the predetermined target velocity and the operational velocity using a proportional integral derivative (PID) control scheme; controlling a velocity of the motor based on a result of the PID control/compensation.

BRIEF DESCRIPTION OF THE DRAWINGS

The foregoing and additional features and characteristics of this disclosure will become more apparent from the following detailed description considered with reference to the accompanying drawings, wherein.

DETAILED DESCRIPTION OF THE INVENTION

Figure 1:
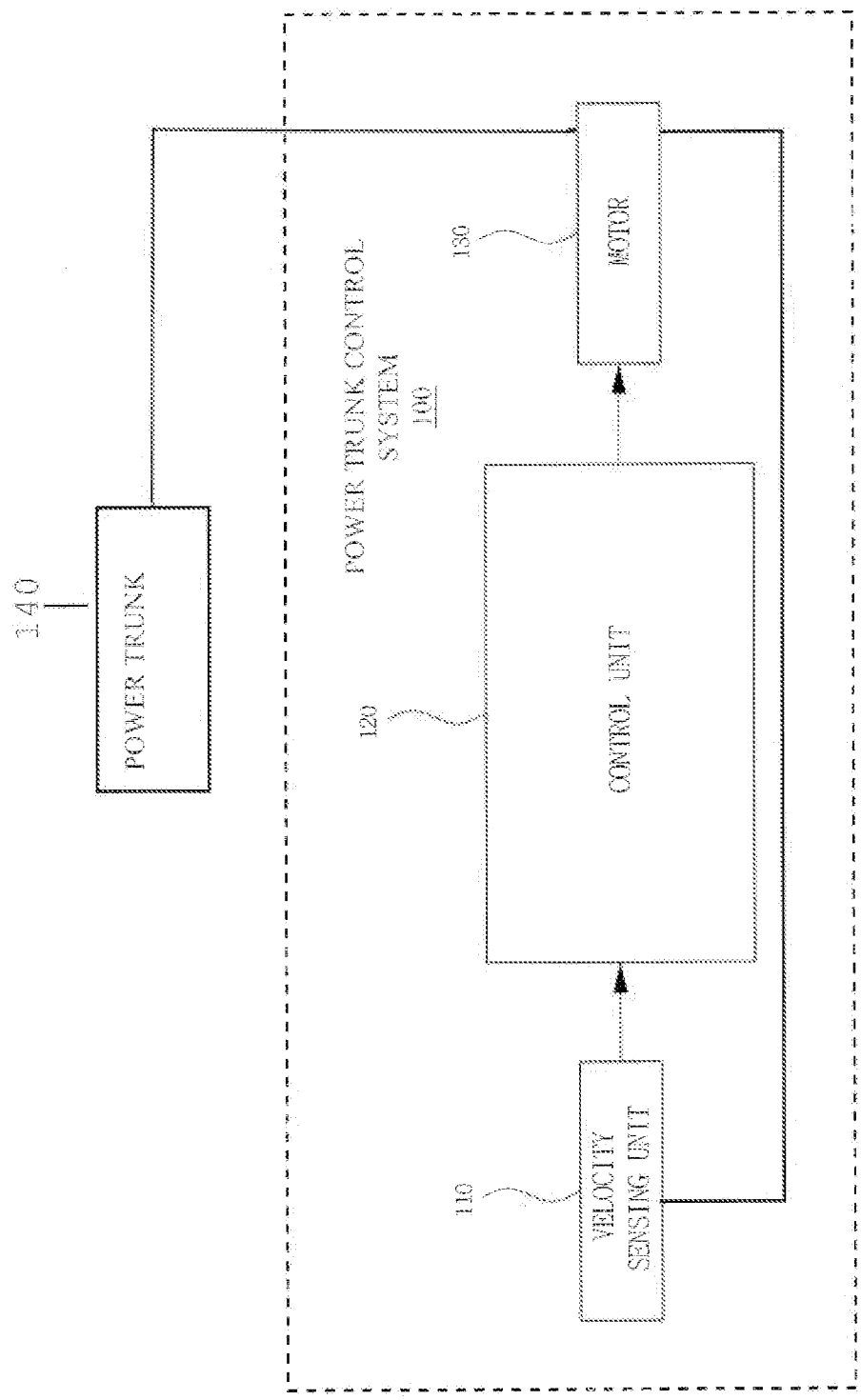
FIG. 1 is a block diagram illustrating a configuration of a power trunk control system according to an embodiment of the invention.

Hereinafter, embodiments of the invention will be described in detail with reference to the accompanying drawings. It is noted that like reference numerals denote like elements throughout overall drawings. In addition, descriptions of well-known apparatus and methods may be omitted so as to not obscure the description of the representative embodiments, and such methods and apparatus are clearly within the scope and spirit of the present disclosure.

The terminology used herein is only for the purpose of describing particular embodiments and is not intended to limit the invention. As used herein, the singular forms "a", "an" and "the" may be intended to include the plural forms as well, unless the context clearly indicates otherwise. It is further to be noted that, as used herein, the terms "comprises", "comprising", "include", and "including" indicate the presence of stated features, integers, steps, operations, units, and/or components, but do not preclude the presence or addition of one or more other features, integers, steps, operations, units, and/or components, and/or combination thereof.

FIG. 1 is a block diagram illustrating a configuration of a power trunk control system 100 according to an embodiment of the invention.

Referring to FIG. 1, the power trunk control system 100 according to an embodiment of the invention is a system for controlling a power trunk 140 in a trunk-equipped vehicle. The power trunk control system 100 includes a velocity sensing unit 110, a control unit 120, and a motor 130.

The velocity sensing unit 110 is used to sense a velocity of the motor 130.

The velocity sensing unit 110 according to an embodiment of the invention is preferably a Hall sensor.

The motor 130 is used to transfer power to the trunk to drive the power trunk 140.

The control unit 120 computes a current trunk position and an operational velocity of the power trunk 140 based on information on the velocity of the motor 130 sensed by the velocity sensing unit 110 and controls the motor 130 based on computation results regarding the position and the operational velocity. The control unit 120 controls the motor 130 such that the operational velocity is compared with a predetermined target velocity, and a difference therebetween is compensated using a proportional integral derivative (PID) control scheme.

According to an embodiment of the invention, the control unit 120 may compare a revolution per minute (RPM) of the motor 130 measured by the Hall sensor and an RPM of the target velocity and control the motor 130 such that a difference between the RPM of the motor 130 measured by the Hall sensor and the RPM of the target velocity is compensated using a PID control scheme.

More specifically, the control unit 120 may control the motor 130 such that a pulse width modulation (PWM) duty ratio is controlled using a PID control scheme.

According to an embodiment of the invention, the control unit 120 may perform PID control/compensation using the following equations.

$$MV_n = MV_{n-1} + \Delta MV_n, \text{ and}$$

$$\Delta MV_n = Kp^*(e_n - e_{n-1}) + Ki^* e_n + Kd^*((e_n - e_{n-1}) - (e_{n-1} - e_{n-2})) \quad \text{[Equation 1]}$$

where $MV_n$ denotes a current manipulated variable, $MV_{n-1}$ denotes a previous manipulated variable, $\Delta MV_n$ denotes a derivative of the current manipulated variable, $e_n$ denotes a current difference, $e_{n-1}$ denotes a previous difference, $e_{n-2}$ denotes a second previous difference, Kp denotes a proportional coefficient, Ki denotes a proportional integral coefficient, and Kd denotes a proportional derivative coefficient.

Figure 2:
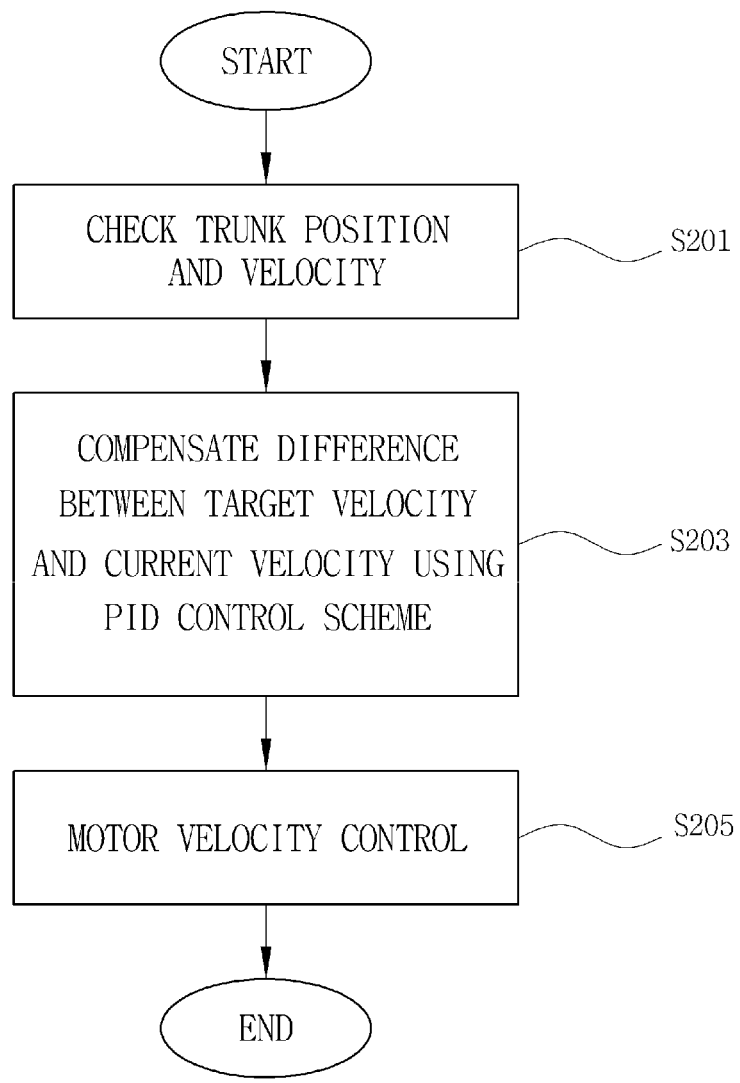
FIG. 2 is a flowchart illustrating a power trunk control method according to an embodiment of the invention.

FIG. 2 is a flowchart illustrating a power trunk control method according to an embodiment of the invention.

Referring to FIG. 2, the control unit 120 checks the current trunk position and the operational velocity based on information on the velocity of the motor 130 sensed by the velocity sensing unit 110 in step S201. According to an embodiment of the invention, the velocity sensing unit 110 is preferably a Hall sensor.

The control unit 120 compares a predetermined target velocity and the operational velocity, and the difference therebetween is compensated using a proportional integral derivative (PID) control scheme in step S201.

The control unit 120 controls a velocity of the motor 120 based on the PID control/compensation results in step S205.

According to an embodiment of the invention, the control unit 120 may control the motor 130 such that an RPM of the motor 130 measured by the Hall sensor is compared with an RPM of the target velocity and the difference therebetween is compensated using a PID control scheme.

According to an embodiment of the invention, the control unit 120 may control the motor 130 such that the PWM duty ratio is controlled using a PID control scheme.

Figure 3:
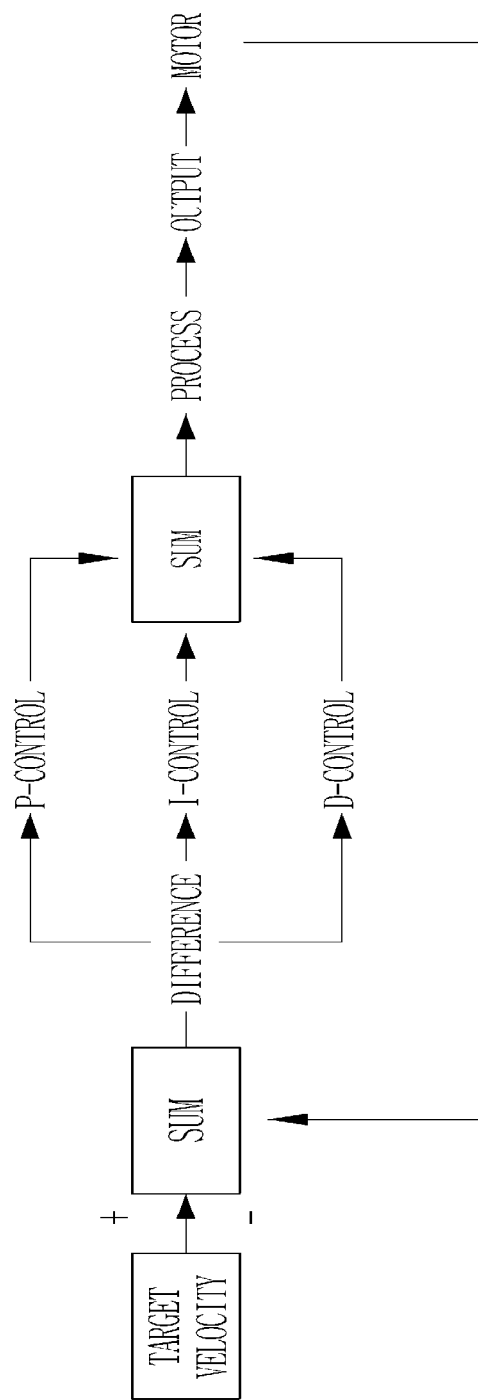
FIG. 3 is a diagram illustrating a power trunk control process according to an embodiment of the invention.

FIG. 3 is a diagram illustrating a power trunk control process according to an embodiment of the invention.

Referring to FIG. 3, the target velocity and the current motor velocity are compared, and the difference between the target velocity and the current motor velocity is compensated using a PID control scheme. In addition, the output power of the motor is controlled such that the PWM duty ratio is controlled using a PID control/compensation process, and the motor 130 is controlled based on the PWM output. Finally, the trunk open/close velocity can be controlled by controlling the velocity of the motor 130.

The PID control is a type of the feedback control capable of constantly maintaining a system output at a reference voltage based on a difference between a control variable and a reference input value. The PID control scheme is a combination of proportional control (P-control), proportional integral control (I-control), and proportional derivative control (D-control).

In the P-control, a control signal is obtained by multiplying a difference signal between a reference signal and a current signal by a suitable proportionality constant gain.

In the I-control, integral control for obtaining a control signal by integrating the difference signal is used in parallel with the P-control.

In the D-control, derivative control for obtaining a control signal by differentiating the difference signal is used in parallel with the P-control.

The PID control scheme is a control scheme for controlling as well as measuring a response of an automation system, and is used to control a temperature, a pressure, a fluid amount, a rotation velocity, and the like. Using the PID control scheme, it is possible to improve a transient state characteristic or address problems in a PI-control scheme or a PD-control scheme.

Figure 4:
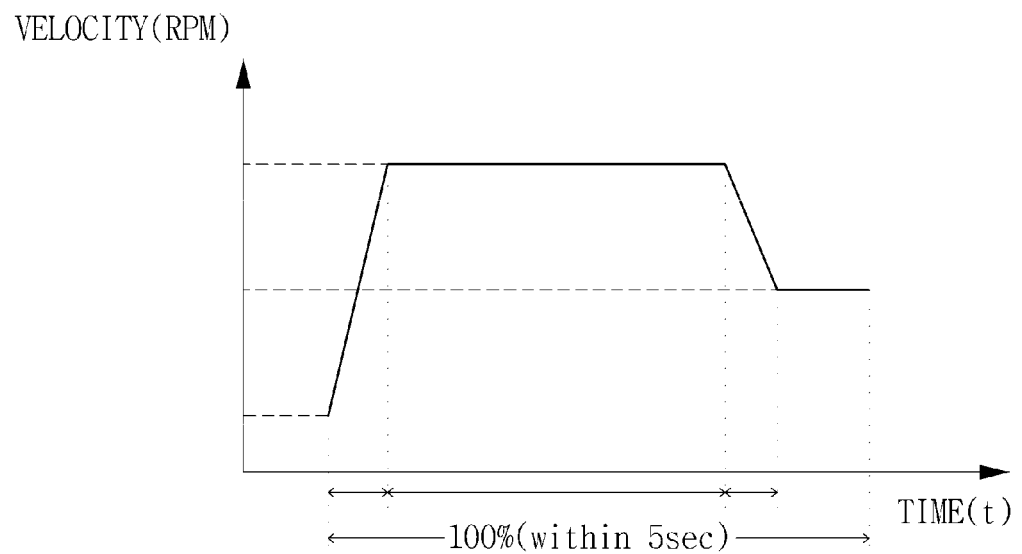
FIG. 4 is a target velocity graph when the trunk is opened according to an embodiment of the invention.

FIG. 4 is a target velocity graph when the trunk is opened according to an embodiment of the invention. Specifically, FIG. 4 is a graph illustrating a target velocity RPM when the trunk is opened.

According to an embodiment of the invention, the velocity of the motor and the RPM information can be checked using a Hall sensor installed in the motor 130. Therefore, it is possible to recognize the current trunk position based on the velocity of the motor.

According to an embodiment of the invention, the target velocity RPM graph and the current RPM of the motor 130 are compared, and a difference therebetween is computed. In addition, the difference is compensated using the PID control scheme.

Figure 5:
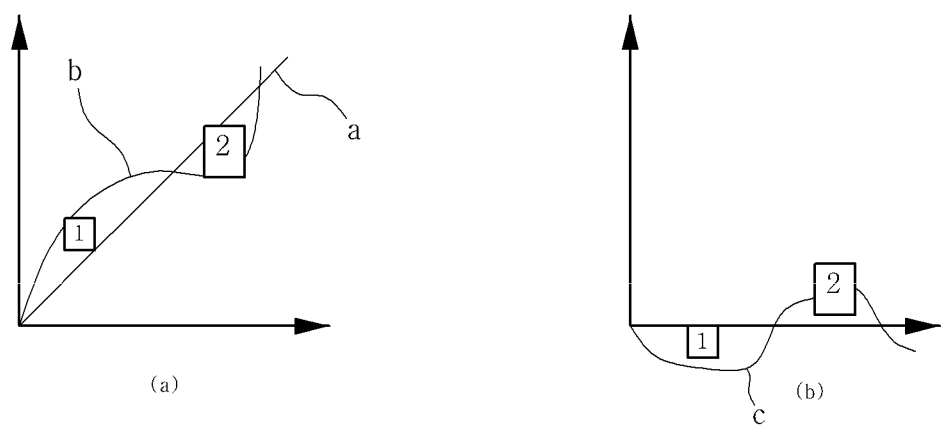
FIGS. 5A and 5B are graphs illustrating a PID control scheme according to an embodiment of the invention.

FIGS. 5A and 5B are graphs illustrating a PID control scheme according to an embodiment of the invention.

FIG. 5A illustrates a target velocity profile (a) an actual velocity profile (b), and FIG. 5B illustrates a PWM output signal.

In the cycle 1 of FIG. 5A, the current RPM of the motor 130 is higher than the RPM of the target velocity. In the cycle 1 of the PWM output graph of FIG. 5B, it is recognized that the PWM output is reduced.

In comparison, in the cycle 2 of FIG. 5A, the current RPM of the motor 130 is lower than the RPM of the target velocity. In the cycle 2 of the PWM output graph of FIG. 5B, it is recognized that the PWM output increases.

According to the present invention, it is possible to constantly control an open/close velocity of a power trunk regardless of a change of external environments (such as a temperature or an inclination) when a power trunk is opened or closed in a vehicle having a power trunk system.

According to the present invention, since the PID control scheme is used to control the PWM duty ratio fixed to a constant rate, it is possible to constantly adjust an open/close velocity of the trunk using a single profile regardless of a change of external environments (such as a temperature or an inclination) and perform instantaneous compensation based on the PID control scheme even when external environment changes during driving. In this manner, according to the present invention, since trunk driving can be controlled constantly using a single profile regardless of any external environment change, it is possible to provide a logically simple method and more stably perform control in adjustment of the open/close velocity of the power trunk.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

What is claimed is:

1. A system for controlling a power trunk in a trunk-equipped vehicle, the system comprising:
    a motor configured to transfer power to the trunk and drive the trunk;
    a velocity sensing unit configured to sense a velocity of the motor; and
    a control unit configured to compute a current trunk position and an operational velocity based on information on the velocity of the motor sensed by the velocity sensing unit and control the motor based on the computed position and the computed operational velocity,
    wherein a predetermined target velocity and the operational velocity are compared, and a difference between the target velocity and the operational velocity is compensated using a proportional integral derivative (PID) control scheme, and
    wherein the control unit uses following equations in the PID control scheme:

$MV_n = MV_{n-1} + \Delta MV_n$, and $\Delta MV_n = Kp^*(e_n - e_{n-1}) + Ki^* e_n + Kd^*((e_n - e_{n-1}) - (e_{n-1} - e_{n-2}))$, where $MV_n$ denotes a current manipulated variable, $MV_{n-1}$ denotes a previous manipulated variable, $\Delta MV_n$ denotes a derivative of the current manipulated variable, $e_n$ denotes a current difference, $e_{n-1}$ denotes a previous difference, $e_{n-2}$ denotes a second previous difference, Kp denotes a proportional coefficient, Ki denotes a proportional integral coefficient, and Kd denotes a proportional differential coefficient.

2. The system according to claim 1, wherein the velocity sensing unit is a Hall sensor.

3. The system according to claim 2, wherein the control unit controls the motor such that a revolution per minute (RPM) of the motor measured using the Hall sensor and an RPM of the target velocity are compared, and a difference between the RPM of the motor and the RPM of the target velocity is compensated using the ND control scheme.

4. The system according to claim 1, wherein the control unit controls the motor such that a pulse width modulation (PWM) duty ratio is controlled based on the PID control scheme.

5. A method of controlling a power trunk in a power trunk system including a trunk, a motor configured to transfer power to the trunk to drive the trunk, a velocity sensing unit configured to sense a velocity of the motor, and a control unit configured to control opening/closing of the trunk, the method comprising:
    obtaining a current position of the trunk and an operational velocity based on information of the velocity of the motor sensed by the velocity sensing unit;
    comparing a predetermined target velocity and the operational velocity and compensating a difference between the predetermined target velocity and the operational velocity using a proportional integral derivative (PID) control scheme; and
    controlling a velocity of the motor based on a result of the PID control/compensation,
    wherein the control unit uses following equations in the PID control scheme:

$MV_n = MV_{n-1} + \Delta MV_n$, and $\Delta MV_n = Kp^*(e_n - e_{n-1}) + Ki^* e_n + Kd^*((e_n - e_{n-1}) - (e_{n-1} - e_{n-2}))$, where $MV_n$ denotes a current manipulated variable, $MV_{n-1}$ denotes a previous manipulated variable, $\Delta MV_n$ denotes a derivative of the current manipulated variable, $e_n$ denotes a current difference, $e_{n-1}$ denotes a previous difference, $e_{n-2}$ denotes a second previous difference, Kp denotes a proportional coefficient, Ki denotes a proportional integral coefficient, and Kd denotes as proportional differential coefficient.

6. The method according to claim 5, wherein the velocity sensing unit is a Hall sensor.

7. The method according to claim 6, wherein the control unit controls the motor such that a revolution per minute (RPM) of the motor measured using the Hall sensor and an RPM of the target velocity are compared, and a difference between the RPM of the motor and the RPM of the target velocity is compensated using the PID control scheme.

8. The method according to claim 5, wherein the control unit controls the motor such that a pulse width modulation (PWM) duty ratio is controlled based on the PID control scheme.

* * * * *